C. E. PATRIC.
PLANTING MACHINE.
APPLICATION FILED APR. 17, 1913.

1,105,997.

Patented Aug. 4, 1914.
3 SHEETS—SHEET 3.

UNITED STATES PATENT OFFICE.

CHARLES E. PATRIC, OF SPRINGFIELD, OHIO.

PLANTING-MACHINE.

1,105,997.  Specification of Letters Patent.  Patented Aug. 4, 1914.

Application filed April 17, 1913. Serial No. 761,665.

*To all whom it may concern:*

Be it known that I, CHARLES E. PATRIC, a citizen of the United States, residing at Springfield, in the county of Clark and State of Ohio, have invented certain new and useful Improvements in Planting-Machines, of which the following is a specification.

This invention relates to improvements in planting machines, and more particularly to improvements upon the machine shown in my prior Patents No. 899,557, dated September 29th, 1908, and No. 982,089, dated January 17, 1911.

An object of my invention is to provide more simple and effective means for varying the speed of the seeding devices.

A further object of the invention is to simplify and make more effective the operation of disengaging the seeding devices from the driving mechanism.

A further object of the invention is to improve the construction and action of certain parts of the seeding devices.

A further object of the invention is to provide a carrying wheel of the open center type, so constructed as to prevent the accumulation of dirt and trash therein.

A further object of the invention is to improve generally the construction and operation of seed planting machines of the type referred to.

The invention consists in the constructions and combinations of parts hereinafter described and set forth in the claims.

Figure 1:
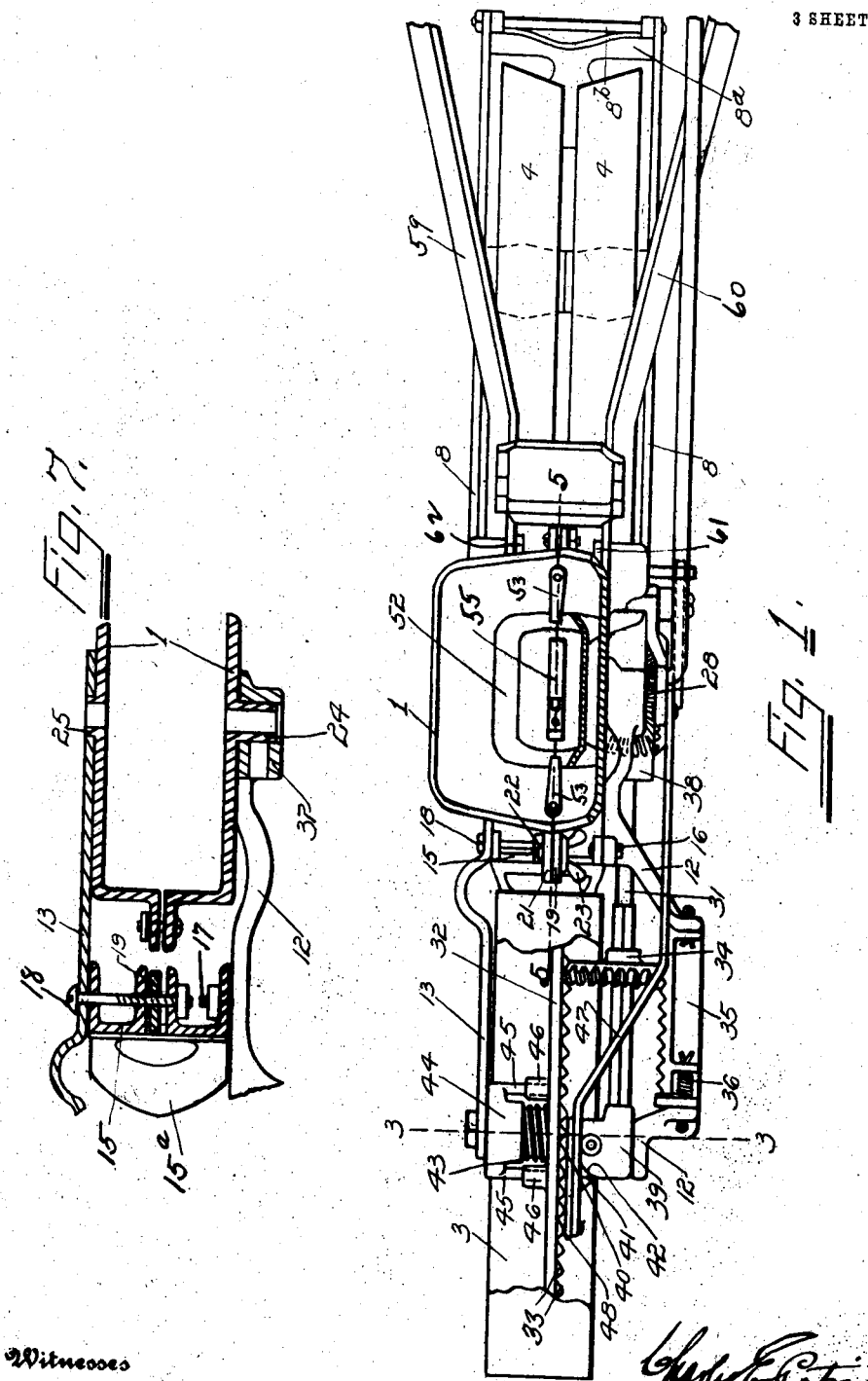
Figure 2:
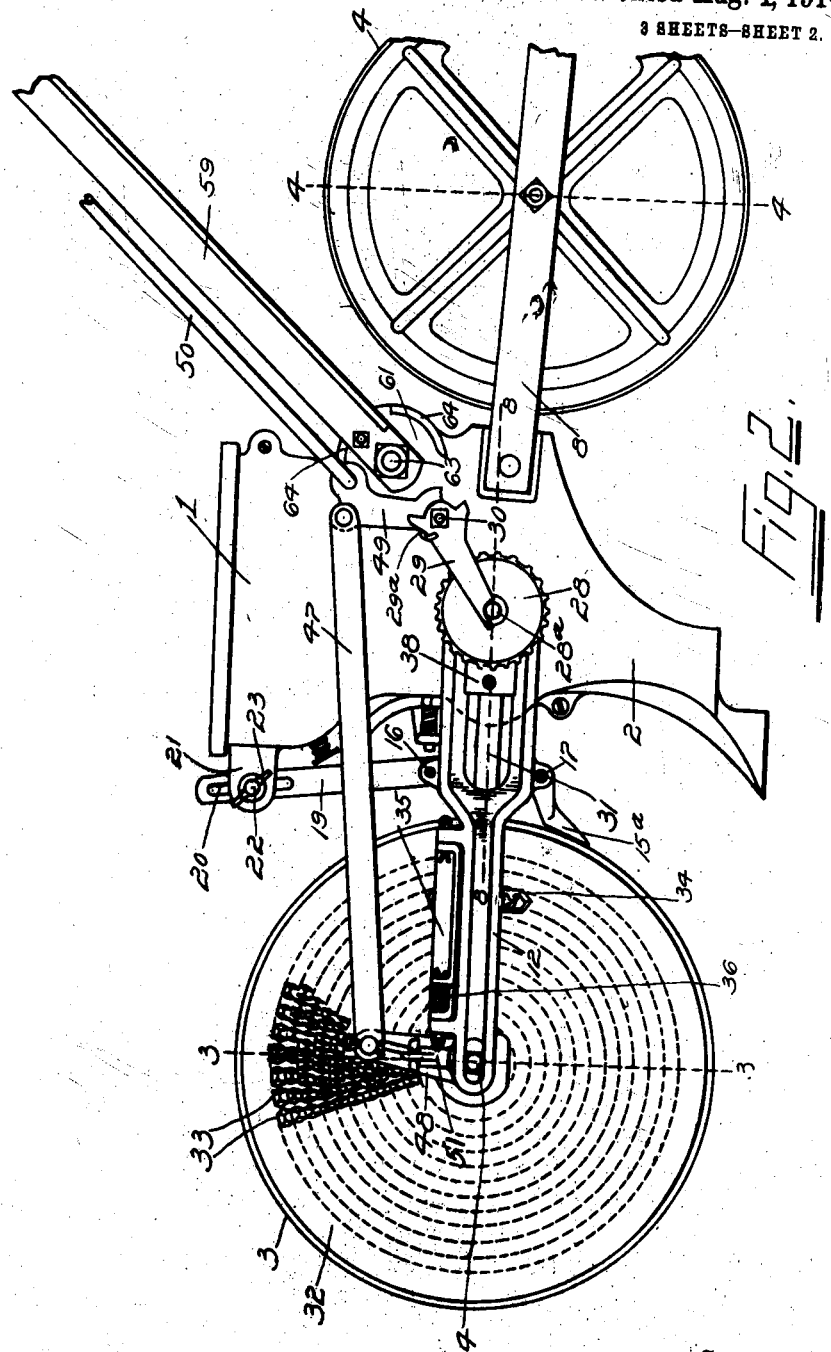
Figure 3:
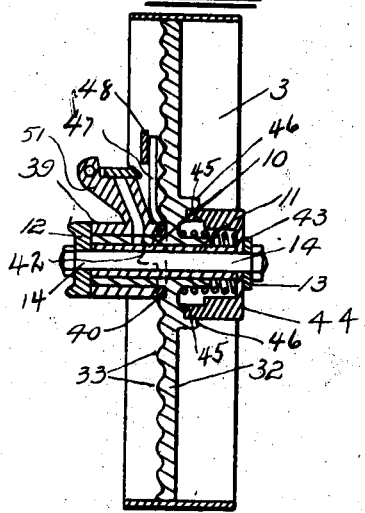
Figure 4:
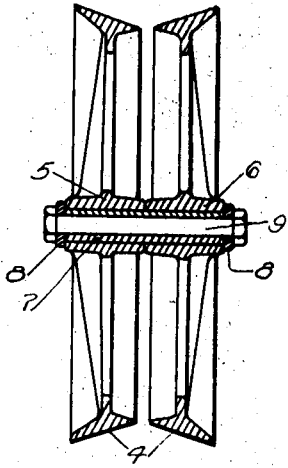
Figure 5:
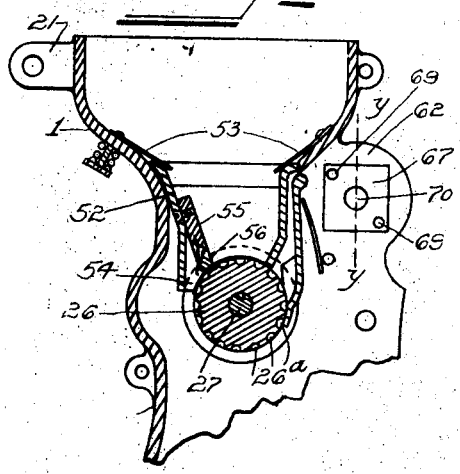
Figure 6:
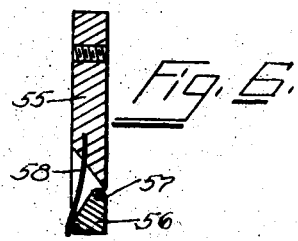

In the accompanying drawings, Figure 1 is a top plan view of a machine embodying the improvements, a portion of the hopper being broken away and shown in section in order to better illustrate some of the parts. Fig. 2 is a side elevation of the same. Fig. 3 is a section on the line 3—3 of Fig. 2. Fig. 4 is a section on the line 4—4 of Fig. 2. Fig. 5 is a vertical section through the main hopper, auxiliary hopper, and feed wheel, the section being taken on the line 5—5 of Fig. 1. Fig. 6 is a detail sectional view of the yieldable gate of the auxiliary hopper. Fig. 7 is a section of a portion of the main hopper and of portions of the front supporting frame, the section being on the line 8—8 of Fig. 2 with some of the parts in that figure removed.

Like parts are represented by similar characters of reference throughout the several views.

As fully set forth in my prior patents referred to, the machine to which these improvements relate is one particularly adapted for the sowing of seeds in gardens and is designed to be propelled by the operator. It has a main hopper portion, 1, having formed preferably integral therewith a furrow opening hoe or shoe, 2; this hopper and furrow opener being preferably formed in two parts suitably bolted together, and also form a support for some of the operating parts.

This combined hopper and furrow opener is supported upon two carrying wheels, 3 and 4. The rear carrying wheel 4 is of the open center type and has a divided hub represented by 5 and 6, journaled upon a bushing or sleeve, 7, clamped between the rearwardly extending arms, 8, by a bolt, 9; (see Fig. 4) these arms 8 being rigidly attached at their forward ends to the main hopper portion 1 and have their other ends extended rearwardly of the wheel 4, so as to provide for a scraper, 8ª, which is attached to said arms by the bolt, 8ᵇ. As a result of this construction, the members of the wheel 4 are permitted to revolve independently of each other so that in operation, the tendency of these members is to revolve one faster than the other at certain points, due to various causes, which effectively prevent the accumulation of mud and trash within the open center thereof.

The hub, 10, of the front wheel 3 is journaled upon a sleeve or bushing 11, (Fig. 3) clamped between the members 12 and 13 of a forwardly extending frame by the bolt, 14. These members 12 and 13 are united together between the wheel 3 and the hopper 1 by a block 15; the member 12 being secured to said block by bolts, 16 and 17, and the arm 13 being secured thereto by the bolt 18; the bolt 18 being extended laterally across the block and forming a pivot for the lower end of a rod, 19, (see Fig. 7) the upper end of which is provided with a slot, 20, so that it may be secured in different positions of adjustment to an ear, 21, projecting forwardly from the main hopper 1, through the medium of a bolt, 22, having thereon a wing-nut, 23. The rear ends of the frame members 12 and 13 are journaled on trunnions, 24 and 25, projecting laterally from the respective sides of the main hopper portion 1, (see Fig. 7 for detail). By this construction it will be seen that by adjusting the rod, 19, and hence raising or lowering the rear ends of the frame members 12 and 13, the furrow-opener 2 may be adjusted with respect to the wheels 3 and 4, which thus act as gage wheels to regulate the depth of planting. The block 15 has an integrally formed downwardly extending scraper 15ª for the front wheel 3.

As described in my former patents referred to, there is located within the lower portion of the hopper 1 a seed wheel 26, splined to a shaft 27 journaled in the trunnions 24 and 25 and carrying at its outer end a beveled gear, 28; this gear and shaft being removable in a manner described in said former patents, and being held in working position by a latch, 29, the free end of which fits over a reduced laterally projecting portion 28ª of the hub of said gear, 28; said latch being pivoted to a bolt, 30, secured to the sides of the hopper, and held in engaging position by a spring 29ª.

The beveled gear 28 derives its motion from a forwardly extending shaft, 31, which is driven from the front wheel 3; the rim and hub of said wheel being connected by a solid web portion 32 provided on one side with a series of concentric rows of teeth 33, adapted to mesh with a shiftable pinion, 34, slidably mounted upon a squared portion of said shaft, 31, and held in different positions of adjustment by a plate 35, having V-shaped notches; said plate being pivotally mounted in said arm 12, which is offset at that point so as to extend about the pinion 34, and permit the respective notches to engage the sides of the teeth of the pinion, which teeth are formed V-shaped to conform to the shape of the notches. The plate is held in working relation with the pinion 34 by a coil-spring 36, one end of which bears against the plate and the other end against the arm. The rear end of the shaft, 31, extends through a bifurcated portion of the frame member 12 and is journaled in a suitable bearing, 37, at the rear end thereof (Fig. 7) and has fixed thereto a beveled pinion, 38, meshing with the teeth of the beveled gear 28. The forward end of the shaft is journaled in a bearing formed in a collar, 39, loosely mounted upon the hub 10 of the wheel 3.

In order to throw the seeding devices out of driving relation with the driving mechanism, to permit the shifting of the pinion 34 and also when transporting the machine. I have interposed between the collar 39 and the web of the wheel 3 a cam ring 40, which has a cam-face 41 adapted to coöperate with the cam-face 42 on the collar 39, so as to throw said collar and hence the shaft 31 and pinion 34 laterally away from the teeth of the wheel 3. This lateral movement is against the tension of a spring, 43, on the opposite side of the web of the wheel 3, which spring is coiled about the hub 10 and seated in a cup 44, arranged between the arm 13 and the bushing 11, and provided with two oppositely-arranged pins 45 to enter sockets 46 projecting from the web of the wheel 3, to cause the cup and spring to revolve with said wheel; the construction being such that as the pinion 34 is thrown out of engaging position with the teeth 33, the spring will be put under tension so as to cause the gears to be returned and held in driving relation with each other when the cam-ring 40 is released. The cam-ring 40 is operated by a rod 47 pivotally connected with a crank arm 48 thereon and extending rearwardly and pivotally connected with an arm 49 pivoted on the bolt, 30; this arm 49 being further provided with a rod 50 which extends rearwardly to within convenient reach of the operator.

In order to lubricate the bearings of the front wheel, the collar 39 is provided with an integral conduit 51 which communicates with the hub 10 and thence with the bearings, through one or more apertures in the hub.

As in my former Patent No. 982,089, there is provided an auxiliary hopper, 52, fitted within the main hopper and having its lower end formed with a converged throat and conformed to the contour of the feed wheel 26; this auxiliary hopper being removably secured within by pivoted spring-pressed latches, 53, so that the auxiliary hopper will be held in yielding contact with the feed wheel. The throat of the auxiliary hopper is extended at one side of the feed wheel to form a discharge opening 54 and this opening is closed by a block 55, attached to the end of this auxiliary hopper and extended to within close proximity to the surface of the feed wheel, which is provided with a series of seed cells 26ª. The lower end of the block 55 is bifurcated and within the bifurcated portion is a gate 56, pivoted at 57 and held in normal closed position by a flat spring 58. The result of this construction is that the seeds will be carried one at a time through the discharge opening by the cells of the feed wheel, but should two seeds become wedged in any cell from any cause, the gate will yield to permit the passage of the same without breaking or cracking the seeds. The form of pivoted spring-pressed gate shown is more certain in its action over the form of the gate shown in my prior Patent No. 982,089, in that it will not get out of line nor become wabbly and is also quicker in its action than the old form of spring.

Having thus described my invention, I claim:

1. In a planting machine, a hopper, a revoluble seed wheel in said hopper, a carrying wheel, concentric rows of teeth on said carrying wheel, a revoluble shaft extending from said carrying wheel to said hopper and geared to said seed wheel, a shiftable pinion on said shaft together with means for holding the same in different positions of adjustment, a spring arranged to force said shaft toward said wheel to hold said pinion in engagement with the teeth of said carrying wheel, and means for throwing and holding said shaft laterally away from said carrying wheel to disengage said pinion and carrying wheel teeth.

2. In a planting machine, a hopper, a furrow opener at the lower end of said hopper, a revoluble seed wheel in said hopper, a feed shaft connected to said seed wheel, a frame pivoted to said hopper about the axis of said feed shaft, a carrying wheel journaled in the free end of said frame, and a driving mechanism between said carrying wheel and said feed shaft.

3. In a planting machine, a hopper, a furrow opener at the lower end of said hopper, a seed wheel in said hopper, a feed shaft for driving said seed wheel, a frame pivoted to said hopper about the axis of said feed shaft, a carrying wheel journaled at the free end of said pivoted frame, concentric rows of teeth on said carrying wheel, an operating shaft carried by said pivoted frame, a shiftable pinion on said operating shaft adapted to engage with the teeth of said carrying wheel and driving gears between said operating shaft and feed shaft.

4. In a planting machine, a hopper, a furrow opener at the lower end of said hopper, a seed wheel in said hopper, a feed shaft connected with said seed wheel, a frame pivotally connected to said hopper about the axis of said feed shaft, a carrying wheel at the free end of said frame, a series of concentric rows of teeth on said carrying wheel, an operating shaft carried by said frame, a shiftable pinion on said operating shaft for engagement with the teeth of said carrying wheel, means for holding said pinion in different positions of adjustment, means for throwing said pinion out of engagement with the teeth of said wheel, and driving gears between said operating shaft and feed shaft.

5. In a planting machine, a hopper, a furrow opener at the lower end of said hopper, seeding devices in said hopper, a feed shaft supported by said hopper for driving said feeding devices, a frame pivoted to said hopper about the axis of said feed shaft, a carrying wheel journaled at the free end of said pivoted frame, driving mechanism between said carrying wheel and said feed shaft, and adjustable means connected with said pivoted frame and hopper for raising and lowering said hopper and furrow opener.

6. In a planting machine, a hopper, seeding devices in said hopper, a frame connected to one end of said hopper, a bearing together with means for clamping the same to the other end of said frame, a carrying wheel journaled on said bearing, a loose sleeve on the hub of said wheel, a spring and spring cap arranged about said bearing on the opposite side of said wheel, a driving shaft journaled in said sleeve, a driving connection between said shaft and said wheel, means for connecting said shaft with said seeding devices, and a cam arranged between said sleeve and wheel for throwing said shaft out of driving relation with said wheel.

7. In a planting machine, a hopper, a furrow opener at the lower end of said hopper, two wheels arranged at the front and rear respectively of said hopper by which said hopper and furrow opener are supported, the front supporting wheel having a series of concentric rows of teeth, seeding devices in said hopper, a longitudinally arranged shaft extending from said front carrying wheel to said seeding devices, a slidable pinion mounted on said shaft adapted to be engaged by the teeth of said front supporting wheel, means for holding said pinion in different positions of adjustment on said shaft, cam devices for moving said shaft away from said wheel to disengage said pinion and teeth, and an operating rod extending from said cam devices to the rear of the machine.

8. In a planting machine, a hopper, a furrow opener at the lower end of said hopper, front and rear supporting wheels for said hopper, seeding devices carried by said hopper including a transversely arranged feed shaft, a frame pivoted to said hopper about the axis of said shaft, the front carrying wheel being journaled at the forward end of said frame, adjustable means for holding said hopper and furrow opener in different positions with respect to said carrying wheels, a series of concentric rows of teeth on the front carrying wheel, a longitudinally arranged operating shaft carried by said pivoted frame, a beveled gear on said feed shaft and a beveled pinion on said operating shaft in driving relation with each other, a shiftable pinion on the squared portion of said operating shaft together with means for holding the same in driving relation with any one of said rows of teeth, and cam devices for separating said operating shaft and toothed supporting wheel to disengage said pinion from the teeth of said wheel.

In testimony whereof, I have hereunto set my hand this 11th day of April 1913.

CHARLES E. PATRIC.

Witnesses:
CHAS. I. WELCH,
ESTHER E. PFEIFER.